US005484838A

United States Patent [19]
Helms et al.

[11] Patent Number: 5,484,838
[45] Date of Patent: Jan. 16, 1996

[54] THERMOPLASTIC COMPOSITIONS WITH MODIFIED ELECTRICAL CONDUCTIVITY

[75] Inventors: Jeffrey H. Helms, Plymouth, Mich.; Edmund J. Blais, Windsor, Canada; Mo-Fung Cheung, Farmington Hills, Mich.

[73] Assignee: Ford Motor Company, Dearborn, Mich.

[21] Appl. No.: 362,040

[22] Filed: Dec. 22, 1994

[51] Int. Cl.⁶ .............. C08K 3/04; C08L 23/06; C08L 23/08
[52] U.S. Cl. .......... 524/496; 524/495; 524/505; 524/508; 524/513; 524/514; 524/515; 524/539; 524/901
[58] Field of Search .................. 524/515, 582, 524/495, 496, 505, 508, 513, 514, 539, 901

[56] References Cited

U.S. PATENT DOCUMENTS

| | | | |
|---|---|---|---|
| 3,963,647 | 6/1976 | Straub | 524/496 |
| 4,041,103 | 8/1977 | Davison et al. | 525/92 |
| 4,132,698 | 1/1979 | Gessler et al. | 524/525 |
| 4,170,664 | 10/1979 | Spenadel et al. | 524/580 |
| 4,265,789 | 5/1981 | Christopherson et al. | 428/244 |
| 4,395,362 | 7/1983 | Satoh et al. | 252/511 |
| 4,592,941 | 6/1986 | Emmons | 428/297 |
| 4,731,199 | 3/1988 | Matsuo et al. | 252/511 |
| 4,734,450 | 3/1988 | Kawai et al. | 524/413 |
| 5,116,540 | 5/1992 | Chundury et al. | 252/511 |
| 5,143,650 | 9/1992 | Gerace et al. | 524/495 |
| 5,206,294 | 4/1993 | Dawson | 525/221 |
| 5,223,106 | 6/1993 | Gerace et al. | 204/181.1 |
| 5,256,574 | 10/1993 | Neuburger et al. | 436/143 |

*Primary Examiner*—Thomas Hamilton, III
*Attorney, Agent, or Firm*—Lorraine S. Melotik; Roger L. May

[57] ABSTRACT

The invention is a molded thermoplastic article having a modified electrical conductivity and hence being particularly adapted for electrostatic painting. The article is composed of a composition comprising a polymer blend of at least two polymers and electrically conductive carbon black. The polymer blend comprises a crystalline polymer and an amorphous or semi-crystalline polymer, the crystalline polymer comprising at least about 35 weight percent of the blend.

10 Claims, No Drawings

THERMOPLASTIC COMPOSITIONS WITH MODIFIED ELECTRICAL CONDUCTIVITY

FIELD OF THE INVENTION

This invention relates to a thermoplastic polymer blend whose electrical conductivity has been modified by means of the addition of electrically conductive carbon black. More particularly, the blend comprises at least a crystalline polymer and an amorphous or semi-crystalline polymer wherein at least a portion of the carbon black is dispersed within the crystalline polymer.

BACKGROUND OF THE INVENTION

Electrostatic painting of substrates is desirable because it can reduce paint waste and emissions as compared to non-electrostatic painting techniques. Electrostatic painting techniques require the substrate to be electrically conducting or to have an applied prepcoat or primer which is electrically conducting, however, in order to display an increased paint transfer efficiency. Currently, injection molded articles are generally made from thermoplastic materials like Xenoy or TPO which are electrically insulating. This quality of the material makes electrostatic painting of articles molded from such resins more complex since an electrically conducing primer must be applied to the article prior to painting using this technique. Transfer efficiency using non-electrostatic techniques is less than 30% on Xenoy itself, whereas Xenoy having a coating of a conducting primer has a transfer efficiency during electrostatic painting approaching 55%. When using an electrically conducting primer, the path to ground is achieved via the conducting primer. This pathway in Xenoy articles is not at all well defined and is attributed to wrap of the primer around the rear of a supported part to a grounded buck. An alternative technique is to use a grounding clip. This undesirably causes higher film builds near the grounding clip with film builds decreasing as the distance from the grounding clip increases. In addition, after several passes through the paint booth, significant resistance to ground may be encountered due to multiple paint layers on the buck itself.

It would be desirable if the electrical conductivity of the substrate bulk material itself could be increased. This would overcome problems associated with electrostatically painting articles whose electrical conductivity is provided only through a conductive primer or prep coat. One solution might be to incorporate additives into the thermoplastic polymer to increase its bulk conductivity. Additives which might be incorporable in other types of polymer, e.g., stainless steel fibers in polyolefin polymers, are not suitable in thermoplastic polymer blends such as TPO or Xenoy because of a degradation of their desirable mechanical properties such as impact strength and tensile elongation, as well as a significant increase in the brittleness of the modified polymer blend. The present invention overcomes these problems.

DISCLOSURE OF THE INVENTION

This invention, according to one embodiment, is a molded thermoplastic article, having a modified electrical conductivity and thus being adapted for electrostatic painting. The article is comprised of a composition comprising:
  (a) a polymer blend of at least two polymers comprising:
    (i) a crystalline polymer having a melting point above about 110° C., and
    (ii) an amorphous or semi-crystalline polymer having a Tg above about −80° C. and a percent crystallinity between 0 and 20 percent, the crystalline polymer comprising at least about 35 weight percent of the polymer blend and being a continuous phase within said polymer blend; and
  (b) an electrically conductive carbon black (i) comprising between about 2.5 and about 7.0 weight percent of the total weight of the composition and (ii) at least a portion of the carbon black is dispersed within the crystalline polymer, wherein the internal electrical conductivity of the article measured at an applied field of 1 volt is between about $10^{-5}$ S/cm and $10^{-12}$ S/cm, and the steady state surface conductivity at 100 volts applied electric field is greater than about $10^{-18}$ S/cm.

According to another embodiment, the invention is the composition disclosed above. A further embodiment of the present invention is a method for increasing the electrical conductivity of a polymer blend by incorporating electrically conductive carbon black therein to form the composition described above.

DETAILED DESCRIPTION OF PREFERRED EMBODIMENTS

The invention composition comprises a polymer blend of at least two polymers, one being a crystalline polymer having a melting point above about 110° C., and the other polymer being an amorphous or semi-crystalline polymer having a Tg above about −80° C. and a percent crystallinity between 0 and 20 percent. The crystalline polymer may be selected from a wide variety of such polymers, preferably, but not limited to crystalline polymers such as polypropylene, polybutylene terephthalate, polyethylene, polyethylene terephthalate, nylon, polyphenylene sulfide, polyether ether ketone, and mixtures thereof. More preferably, the crystalline polymer, when making articles such as automotive fascia, is polypropylene, polyethylene, or terephthalate polybutylene. The amorphous or semi-crystalline polymer, having the characteristics described above, may be any such polymer preferably being one such as polycarbonate, natural and synthetic polyisoprene rubbers, ethylene-propylene copolymers (EPM), ethylene-propylene diene rubbers (EPDM), chlorinated rubbers, nitrile rubbers, polystyrene, polyphenylene oxides, methylmethacrylate styrene-butadiene block copolymers, polyether sulfones, polysulfones, polyarylates, other impact modifiers such as styrene-butadiene block copolymer, and mixtures thereof.

According to the present invention, the crystalline polymer is at least about 35 weight percent of the polymer blend and is present as a continuous phase within the polymer blend. By continuous phase within the polymer blend is meant this component of the blend forms an infinite or percolating structure within the blend. The terminology of continuous and dispersed phases can be defined as follows. Beginning with a single polymer system, particles of a second polymer are added. At low concentrations, the second polymer is defined as being dispersed in the first. As the concentration of dispersed particles increases, dispersed particles will be placed close enough to each other to be regarded as connected. Increasing the concentration of this dispersed polymer further eventually leads to larger groups of associated particles until continuity is established throughout the first polymer. In our case, the crystalline polymer will be a continuous, or connected phase, throughout the blend when its concentration in the blend reaches a critical concentration, usually in the 35 weight percent range or higher. Preferably, the crystalline polymer is at least about 40 weight % of the polymer blend, more preferably being between about 50 and 70 weight % of the blend. As the weight percent of crystalline polymer increases, the impact resistance decreases and the material becomes stiffer. Examples of particularly preferred blends for automotive fascia and exterior trim components are Xenoy, a blend of polybutylene terephthalate, impact modifier, and polycarbonate, and TPO, a blend of polypropylene and a rubber material which can be an ethylene-propylene copolymer.

Still other materials may be included in the composition along with the crystalline polymer and amorphous polymer, in a minor proportion by weight, to further modify its properties. Exemplary of such materials may be polymers like polypropylene-g-anhydride, ethylene-propylene-anhydride copolymers, graft copolymers of isotactic polypropylene and ethylene-propylene copolymers, or other compatibilizers. Still other materials which might be advantageously included in the composition are inorganic fillers such as calcium carbonate, $CaCO_3$, talc, or hydrated aluminum oxides, $Al_2O_3$.

Another required component of the composition, in addition to the polymer blend, is electrically conductive carbon black. This electrically conductive carbon black comprises between about 2.5 and about 7.0 weight percent of the total weight of the thermoplastic composition and at least a portion of this carbon black is dispersed within the crystalline polymer. More preferably, the carbon black comprises between about 3 and 6 weight percent of the total weight of the composition, wherein more preferably at least 70 percent of the carbon black is dispersed in the crystalline polymer. As a consequence of incorporating the carbon black, and more particularly because at least a portion is incorporated in the crystalline polymer which forms a continuous phase within the polymer blend, a relative low level of carbon black is required to provide sufficient electrical conductivity to the thermoplastic composition for dissipation function. As a result of the relatively minor amount carbon black modification of the polymer blend in this particular way, the internal electrical conductivity of an article made from the composition measured at an applied field of 1 volt is between about $10^{-5}$ S/cm and $10^{-12}$ S/cm, and the surface conductivity at 100 volts applied electric field is greater than about $10^{-18}$ S/cm. Hence, as described above, this particular modification of the polymer blend allows for a significant electrical conductivity increase while doing so with a relatively small amount of carbon black to not have a detrimental impact on the chemical/physical properties of the thermoplastic composition. The surface electrical conductivity of unmodified TPO and Xenoy blends is less than $10^{-18}$ S/cm. This value can be increased to $10^{-15}$ S/cm upon modification. Typically this value will be $10^{-16}$–$10^{-17}$ for modified materials. The internal, or core, conductivity of these unmodified blends is typically the same as the surface resistivity, or less than $10^{-18}$ S/cm. Upon modification, this internal value is increased to $10^{-5}$–$10^{-12}$ S/cm. This significant increase in core conductivity is critical for reaching an electrically dissipating molded part.

The electrically conductive carbon black incorporated into the polymer blend preferably has a particle size between about 20 and 50 nanometers and a pH between about 6.5 and 10, wherein the percent volatiles of the carbon black is preferably between abut 0.2 and 1.5. Generally, and preferably, the pore volume (DBP absorption) of the carbon black is between about 150 and 400 $cm^3$/100 g. Exemplary of electrically conductive carbon blacks useful in this invention are those such as AKZO Chemicals Ketjenblacks EC-300J or EC-600J, and Columbian Chemicals Company Conductex 975U.

In the present invention, at least a portion of the electrically conductive carbon black is dispersed within the crystalline polymer of the polymer blend. One way to accomplish this is by incorporating the carbon black into the thermoplastic composition in the form of a concentrate of carbon black in the crystalline polymer. Still another way is to add free carbon powder directly to the plasticized blend. When added in concentrate form the majority of the carbon additive is concentrated in the amorphous region of the crystalline component, or stated differently, at the interface of the crystalline polymer and amorphous polymer but largely contained in the crystalline component. When added as a free powder, there is a statistical distribution of the carbon additive within all components, which tends to slightly increase the required concentration.

As disclosed above, the modified thermoplastic composition of the invention may be made by adding the conductive carbon material to the blend components either in concentrate form or as a free powder. This addition can be performed using a variety of mixing and compounding techniques including Banbury mixers, twin screw extruders, and advance processing compounders or kneader extruders. In these techniques, the materials are blended in order to provide a homogenous blend with the necessary impact modifier dispersion and domain size. In order to optimally provide the desired conductivity in the final injection molded or blow molded part, it is desirable that care be taken in handling the carbon additive. Concentrates should be prepared either in twin screw or single screw extruders with screw profiles which optimize carbon aggregate dispersion without decomposition of aggregate sizes. Free powder addition optimally requires introduction of the electrically conductive carbon downstream in the compounding process, or careful control of the blending shear profiles. One of the preferred methods involves preparing a 15 weight percent concentrate of EC-300J in the crystalline polymer using a twin screw extruder. This concentrate may then be introduced at the correct level with the other components including additional crystalline component on a twin screw extruder or Banbury mixer. It is most preferred that the concentrate not be prepared using high shear techniques as occur with a Banbury mixer. This compounded material is then pelletized, dried, and injection molded to produce the electrically dissipating part. In another preferred method, dry powder of EC-300J is added directly to the blend ingredients and mixed using any of the above mixing/compounding techniques and pelletized.

The thermoplastic composition of the invention can be used to make a variety of articles including, but not limited to, automotive fascia, rocker panels, spoilers, or other vehicle exterior or interior trim components. Since the composition has increased electrical conductivity it is particularly useful to make articles, like automotive facia, which are generally subject to painting. By modifying such thermoplastic materials to have an electrical conductivity, they are ideally suited to make articles which may then be efficiently painted using electrostatic techniques as described above.

The following examples are meant to describe preferred embodiments of the present invention.

EXAMPLE 1

60 parts by weight polypropylene, 28 parts by weight ethylene-propylene copolymer, and 7 parts by weight high density polyethylene were mixed and metered into a Buss America kneader extruder operated at 250 rpm, 200° C., and at an output rate of 60 lb./hr. 5 parts by weight Ketjenblack® (Akzo Chemicals Inc., Akron, Ohio) EC-300J, nominal particle size of 30 nm, pH=9, pore volume=325 cm$^3$/100 g, percent volatiles=0.6, and ash content=0.1 was added downstream to the compounded and plasticized polymer blend. The resulting material was pelletized and 4"×6" plaques were injection molded on a 250 ton Cincinnati Milacron injection molding unit at a mold temperature of 100° F., 430° F. melt temperature, 1000 psi injection pressure, 50 psi back pressure, and 3 second fill rate. Measured injection molded material properties were Izod impact=12.8 ft.lb./in.; Dynatup impact at −30° C.=39.7 joules; and flexural modulus= 735 MPa. The measured carbon content by pyrolysis was determined to be 4.7 to 5.3 weight percent. The steady state surface conductivity was measured as $3.3 \times 10^{-16}$ S/cm. The internal or core resistivity was measured to be $5.5 \times 10^{-7}$ S/cm.

EXAMPLE 2

Using polypropylene as the concentrate carrier, a 15 weight percent EC-300J carbon concentrate was prepared on a Haake Rheocord 90 twin screw extruder operated at 75 rpm and barrel temperatures ranging between 200° and 230° C. by adding a dry mixture of polypropylene pellets and dry carbon powder. This material was pelletized after in a continuous fashion after cooling the extruded strand in a water bath. 28 parts by weight polypropylene, 40 parts by weight EC-300J/polypropylene concentrate, 27 parts by weight ethylene-propylene-diene copolymer, and 5 parts by weight polyethylene hand mixed in dry form and introduced to a Farrel type dual blade Banbury mixer. The materials were then blended at 200 rpm for 3 minutes without external mixing reaching a shear induced temperature of 410° F. The molten blend was introduced into a single screw extruder for pelletization. The final pellets were injection molded using a BOY 50 ton injection molding unit. The resulting plaques were evaluated for mechanical and electrical properties. The results were Izod impact=12.24 ft.lb./in.; flexural modulus= 780 MPa; and Dynatup impact at −30° C.=35.6 joules. The surface and internal conductivities were measured to be $8.3 \times 10^{-18}$ S/cm and $7.7 \times 10^{-8}$ S/cm, respectively.

EXAMPLE 3

Using the same carbon concentrate as in Example 2, 33.3 parts by weight concentrate, 27 parts by weight ethylene-propylene rubber, 5 parts polyethylene, and 34.7 parts by weight polypropylene were compounded using a twin screw extruder. The resulting pelletized material was injection molded into 10"×20" plaques. The measured surface and internal electrical conductivities were measured to be $2 > 10^{-17}$ and $1 \times 10^{-5}$ S/cm, respectively. No difference in mechanical properties relative to a material formed without the conducting carbon were observed. Electrostatic painting studies showed a 220% increase in film thickness of an applied white base coat relative to the unmodified material.

EXAMPLE 4

26.7 parts by weight of the concentrate 15% EC-300J in polypropylene and 2 parts by weight Conductex® (Columbian, Atlanta, Ga.) 975U, particle size 21 nm, pore volume 165 cm$^3$/100g, pH=7, and percent volatiles=1.5, were combined with 38.3 parts by weight polypropylene, 28 parts by weight ethylene-propylene diene copolymer, and 5 parts by weight polyethylene on a twin screw extruder. The resulting blend was pelletized and injection molded into 4"×6" plaques. The resulting plaques exhibited a surface conductivity of $1.25 \times 10^{-17}$ S/cm and an internal core conductivity of $5.6 \times 10^{-8}$ S/cm.

EXAMPLE 5

A 15 weight percent EC-300J concentrate was prepared using polybutylene terephthalate (PBT) powder as the carrier resin. The dried carbon and PBT carrier powders were premixed in dry form and introduced to a low shear profile twin screw extruder operated at 520° F. 20 parts by weight of the resulting concentrate, 30 parts by weight PBT pellets, 45 parts by weight polycarbonate, and 5 parts by weight of a styrene-butadiene block copolymer were added to a high shear profile twin screw extruder and pelletized. The resulting pellets were injection molded into 4"×6" plaques. The resulting surface and internal conductivities were measured to be $1.7 \times 10^{-17}$ S/cm and $3.6 \times 10^{-6}$ S/cm, respectively.

We claim:

1. A molded thermoplastic article, having a modified electrical conductivity, adapted for electrostatic painting, said article being comprised of a composition comprising:
   (a) a polymer blend of at least two polymers comprising:
      (i) a crystalline polymer having a melting point above about 110° C., and
      (ii) an amorphous or semi-crystalline polymer having a Tg above about −80° C. and a percent crystallinity between 0 and 20 percent, said crystalline polymer comprising at least about 35 weight percent of said polymer blend and being a continuous phase within said polymer blend; and
   (b) electrically conductive carbon black (i) comprising between about 2 and about 7.0 weight percent of the total weight of said composition and (ii) at least a portion of said carbon black being dispersed within said crystalline polymer, wherein the internal electrical conductivity of said article measured at an applied field of 1 volt is between about $10^{-5}$ S/cm and $10^{-12}$ S/cm, and the steady surface conductivity at 100 volts applied electric field is greater than about $10^{-18}$ S/cm.

2. The article according to claim 1 wherein said crystalline polymer is selected from the group consisting of polypropylene, polybutylene terephthalate, polyethylene, polyethylene terephthalate, nylon, polyphenylene sulfide, polyether ether ketone, and mixtures thereof.

3. The article according to claim 1 wherein said amorphous polymer is selected from the group consisting of polycarbonate, natural and synthetic polyisoprene rubbers, ethylene-propylene copolymers (EPM), ethylene-propylene diene rubbers (EPDM), chlorinated rubbers, nitrile rubbers, polystyrene, polyphenylene oxides, methylmethacrylate styrene-butadiene block copolymers, polyether sulfones, polysulfones, polyarylates, other impact modifiers, and mixtures thereof.

4. The article according to claim 1 wherein at least 70 percent of said carbon black is dispersed in said crystalline polymer.

5. The article according to claim 1 wherein said carbon black has a particle size between about 20 and 50 nanometers.

6. The article according to claim 5 wherein said carbon black has a pH between about 6.5 and 10, percent volatiles of between about 0.2 and 1.5, and a pore volume between about 150 and 400 cm$^3$/100 g.

7. The article according to claim 1 wherein said carbon black is incorporated into said composition in the form of a concentrate in said crystalline polymer.

8. A molded thermoplastic automotive article having an electrical conductivity adapted for electrostatic painting, said article being comprised of a composition comprising:
   (a) a polymer blend of at least two polymers comprising:
      (i) a crystalline polymer having a melting point above about 140° C., and
      (ii) an amorphous polymer or semi-crystalline having a Tg above about −80° C. and a percent crystallinity between 0 and 20 percent, said crystalline polymer comprising at least about 35 weight percent of said polymer blend and being a continuous phase within said polymer blend; and
   (b) electrically conductive carbon black (i) comprising between about 2.5 and about 7.0 weight percent of the total weight of said composition and (ii) at least a portion of said carbon black being dispersed within said crystalline polymer, wherein the internal electrical conductivity of said article measured at an applied field of 1 volt is between about $10^{-5}$ S/cm and $10^{-12}$ S/cm, and the surface conductivity at 100 volts applied electric field is greater than about $10^{-18}$ S/cm.

9. A method for modifying the electrical conductivity of thermoplastic polymers, which method comprises the steps of:
   providing a polymer blend of at least two polymers comprising:
      (i) a crystalline polymer having a melting point above about 110° C., and
      (ii) an amorphous polymer or semi-crystalline having a Tg above about −80° C. and a percent crystallinity between 0 and 20 percent, said crystalline polymer comprising at least about 60 weight percent of said polymer blend and being a continuous phase within said polymer blend; and incorporating electrically conductive carbon black within said composition, said carbon black (i) comprising between about 3.0 and about 6.0 weight percent of the total weight of said composition and (ii) at least a portion of said carbon black being dispersed within said crystalline polymer, wherein the internal electrical conductivity of said carbon black modified thermoplastic polymeric composition measured at an applied field of 1 volt is between about $10^{-5}$ S/cm and $10^{-10}$ S/cm, and the surface conductivity at 100 volts applied electric field is greater than about $10^{-17}$ S/cm.

10. A molded thermoplastic composition having a modified electrical conductivity and adapted for electrostatic painting, said composition comprising:
   (a) a polymer blend of at least two polymers comprising:
      (i) a crystalline polymer having a melting point above about 110° C., and
      (ii) an amorphous or semi-crystalline polymer having a Tg above about −80° C. and a percent crystallinity between 0 and 20 percent, said crystalline polymer comprising at least about 35 weight percent of said polymer blend and being a continuous phase within said polymer blend; and
   (b) electrically conductive carbon black (i) comprising between about 2 and about 7.0 weight percent of the total weight of said composition and (ii) at least a portion of said carbon black being dispersed within said crystalline polymer, wherein the internal electrical conductivity of said molded composition measured at an applied field of 1 volt is between about $10^{-5}$ S/cm and $10^{-12}$ S/cm, and the steady surface conductivity at 100 volts applied electric field is greater than about $10^{-18}$ S/cm.

* * * * *